United States Patent
Carbaugh et al.

(10) Patent No.: US 12,466,371 B2
(45) Date of Patent: Nov. 11, 2025

(54) SYSTEM AND METHOD FOR ADJUSTMENT OF AUTONOMOUS EMERGENCY BRAKING RESPONSIVE TO CHANGES IN VEHICLE MASS

(71) Applicant: Bendix Commercial Vehicle Systems LLC, Avon, OH (US)

(72) Inventors: Jeffrey M. Carbaugh, Lakewood, OH (US); Justin R. Miller, Elyria, OH (US); Justin Turner, North Canton, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 230 days.

(21) Appl. No.: 18/353,957

(22) Filed: Jul. 18, 2023

(65) Prior Publication Data

US 2025/0026327 A1    Jan. 23, 2025

(51) Int. Cl.
*B60T 8/18* (2006.01)
*B60T 7/22* (2006.01)
*B60T 8/17* (2006.01)

(52) U.S. Cl.
CPC .............. *B60T 8/1887* (2013.01); *B60T 7/22* (2013.01); *B60T 8/1708* (2013.01); *B60T 2250/02* (2013.01)

(58) Field of Classification Search
CPC ........ B60T 8/1887; B60T 8/1708; B60T 7/22; B60T 2201/022; B60T 2250/02;

(Continued)

(56) References Cited

U.S. PATENT DOCUMENTS 11,760,321 B2 * 9/2023 Kim ......................... B60T 7/22
    701/70
2019/0064848 A1 * 2/2019 Hofsaess ................. H04W 4/44
(Continued)

FOREIGN PATENT DOCUMENTS

CN        107804305 B     7/2019
CN        112046455 A     12/2020
(Continued)

OTHER PUBLICATIONS

English (machine) translation of CN 112046455 A.
(Continued)

*Primary Examiner* — Logan M Kraft
*Assistant Examiner* — Johnny H Hoang
(74) *Attorney, Agent, or Firm* — Reising Ethington P.C.

(57) ABSTRACT

An autonomous emergency braking system includes a sensor generating a collision risk signal indicative of an object in a path of travel of the vehicle and a controller. The controller determines whether an indication of a mass of the vehicle is present and, if so, adjusts a default deceleration value corresponding to a predetermined rate of deceleration for the vehicle in response to the mass to obtain a mass-adjusted deceleration value. The controller establishes, responsive to the mass-adjusted deceleration value, successive times for generating first and second braking commands to an engine or brake controller or increasing braking forces for the first and second braking commands configured to cause deceleration of the vehicle at first and second rates of deceleration, the second rate greater than the first. The first and second braking commands are generated responsive to the collision risk signal.

15 Claims, 2 Drawing Sheets

(58) Field of Classification Search
CPC ........... B60W 50/14; B60W 30/18109; B60W 2050/143; B60W 2530/10; B60W 30/16; B60W 10/196; B60W 10/184; B60W 40/13; B60W 2420/403; B60W 2420/408; B60W 40/04; B60W 10/06; B60W 30/02; B60Q 1/00; B60Q 23/00; G08B 23/00
USPC ....... 340/425.5, 436, 573.1, 963; 701/70–83, 701/93, 96, 301
See application file for complete search history.

(56) References Cited

U.S. PATENT DOCUMENTS

| | | | | |
|---|---|---|---|---|
| 2019/0217829 | A1* | 7/2019 | Kim | .......................... B60T 7/22 |
| 2020/0062251 | A1* | 2/2020 | Park | .................. B60W 30/0956 |
| 2022/0111823 | A1* | 4/2022 | Kim | .......................... B60T 7/22 |
| 2022/0212694 | A1* | 7/2022 | Varnhagen | ........ B60W 60/0018 |
| 2022/0289174 | A1* | 9/2022 | Hashimoto | ....... B60W 60/0015 |
| 2022/0289176 | A1 | 9/2022 | Baek | |

FOREIGN PATENT DOCUMENTS

| | | |
|---|---|---|
| CN | 113147712 A | 7/2021 |
| DE | 102015014305 A1 | 6/2016 |
| JP | 2022169020 A | 11/2022 |

OTHER PUBLICATIONS

English (machine) translation of CN 113147712 A.
Extended European Search Report issued in European Patent App. No. 24183076.9 (Dec. 10, 2024).
English (machine) translation of CN 107804305 B.
English (machine) translation of DE 102015014305 A1.
English (machine) translation of JP 2022169020 A.

* cited by examiner

SYSTEM AND METHOD FOR ADJUSTMENT OF AUTONOMOUS EMERGENCY BRAKING RESPONSIVE TO CHANGES IN VEHICLE MASS

BACKGROUND OF THE INVENTION a. Field of the Invention

This disclosure relates to autonomous emergency braking systems for vehicles. In particular, this disclosure relates to system and method for adjusting autonomous emergency braking of a vehicle responsive to changes in the mass of the vehicle.

b. Background Art

Conventional vehicles increasingly employ advanced driver assistance systems (ADAS) that assume control, or supplement operator control, of various vehicle systems based on conditions associated with the vehicle, the road surface, and objects that surround the vehicle including pedestrians, other vehicles and road infrastructure. Exemplary systems include adaptive cruise control systems, anti-lock braking systems (ABS), and collision avoidance systems including, for example, blind spot monitoring, lane departure warning and lane keep and lane change assist systems. Another conventional system is referred to as autonomous emergency braking (AEB) and may be implemented as a stand-alone system or as a function of one of the systems mentioned above. In AEB, emergency braking is implemented when certain conditions are detected in order to slow or stop movement of the vehicle. When conditions are detected that require braking, a controller generates one or more commands causing application of the vehicle wheel brakes.

In certain vehicles such as tractor-trailers, the load of the vehicle and, therefore, the overall mass of the vehicle may vary significantly. A tractor may, for example, operate without any attached trailers (i.e., a bobtail configuration). Alternatively, the tractor may have one or more trailers attached each of which may be unloaded, partially loaded or fully loaded. Because the loads on, and overall mass of, the vehicle vary significantly, the time, the distance and the level of deceleration required to bring the tractor and any attached trailers to a stop from any given speed also vary significantly. Conventional AEB systems, however, typically assume a constant, predetermined level of deceleration for the vehicle and use this predetermined level of deceleration to determine when to initiate braking in the vehicle and/or the braking force. If the predetermined level of deceleration assumes a lightly loaded vehicle, the AEB system in the vehicle may fail to stop the vehicle in sufficient time to prevent a collision when the vehicle is more heavily loaded. If the predetermined level of deceleration assumes a heavily loaded vehicle, the AEB system in the vehicle may stop the vehicle far away from any potential collision when the vehicle is more lightly loaded. Conventional AEB systems therefore often set the predetermined level of deceleration at a compromise value between values for a minimally loaded and maximumly loaded vehicle thereby sacrificing some stopping and collision-avoidance performance to avoid bringing the vehicle to a stop too soon.

The inventors herein have recognized a need for an autonomous emergency braking system and method for a vehicle that will minimize and/or eliminate one or more of the above-identified deficiencies.

BRIEF SUMMARY OF THE INVENTION

This disclosure relates to autonomous emergency braking systems for vehicles. In particular, this disclosure relates to system and method for adjusting autonomous emergency braking of a vehicle responsive to changes in the mass of the vehicle.

One embodiment of an autonomous emergency braking system for a vehicle includes a sensor configured to generate a collision risk signal indicative of an object in a path of travel of the vehicle. The system further includes an autonomous emergency braking controller. The autonomous emergency braking controller is configured to determine whether an indication of a mass of the vehicle is present and adjust, if an indication of the mass of the vehicle is present, a first deceleration value corresponding to a predetermined rate of deceleration for the vehicle in response to the mass of the vehicle to obtain second deceleration value. The autonomous emergency braking controller is further configured to establish, responsive to the second deceleration value, one of a first time for generation of a first braking command to one of an engine controller and a brake controller and a first braking force for the first braking command. The first braking command is configured to cause deceleration of the vehicle at a first rate of deceleration. The autonomous emergency braking controller is further configured to establish, responsive to the second deceleration value, a corresponding one of a second time, later than the first time, for generation of a second braking command to the one of the engine controller and the brake controller and a second braking force, greater than the first braking force, for the second braking command. The second braking command is configured to cause deceleration of the vehicle at a second rate of deceleration greater than the first rate of deceleration. The autonomous emergency braking controller is further configured to generate, responsive to the collision risk signal, the first braking command and the second braking command.

One embodiment of a method for autonomous emergency braking in a vehicle includes determining whether an indication of a mass of the vehicle is present and adjusting, if an indication of the mass of the vehicle is present, a first deceleration value corresponding toa predetermined rate of deceleration for the vehicle in response to the mass of the vehicle to obtain second deceleration value. The method further includes establishing, responsive to the second deceleration value, one of a first time for generation of a first braking command to one of an engine controller and a brake controller and a first braking force for the first braking command. The first braking command is configured to cause deceleration of the vehicle at a first rate of deceleration. The method further includes establishing, responsive to the second deceleration value, a corresponding one of a second time, later than the first time, for generation of a second braking command to the one of the engine controller and the brake controller and a second braking force, greater than the first brake force, for the second braking command. The second braking command is configured to cause deceleration of the vehicle at a second rate of deceleration greater than the first rate of deceleration. The method further includes generating, responsive to a collision risk signal indicative of an object in a path of travel of the vehicle, the first braking command and the second braking command.

One embodiment of an article of manufacture includes a non-transitory computer storage medium having a computer program encoded thereon that when executed by a controller implements autonomous emergency braking in a vehicle. The computer program includes code for determining whether an indication of a mass of the vehicle is present and adjusting, if an indication of the mass of the vehicle is present, a first deceleration value corresponding to a predetermined rate of deceleration for the vehicle in response to the mass of the vehicle to obtain second deceleration value. The computer program further includes code for establishing, responsive to the second deceleration value, one of a first time for generation of a first braking command to one of an engine controller and a brake controller and a first braking force for the first braking command. The first braking command is configured to cause deceleration of the vehicle at a first rate of deceleration. The computer program further includes code for establishing, responsive to the second deceleration value, a corresponding one of a second time, later than the first time, for generation of a second braking command to the one of the engine controller and the brake controller and a second braking force, greater than the first brake force, for the second braking command. The second braking command is configured to cause deceleration of the vehicle at a second rate of deceleration greater than the first rate of deceleration. The computer program further includes code for generating, responsive to a collision risk signal indicative of an object in a path of travel of the vehicle, the first braking command and the second braking command.

A system and method for autonomous emergency braking in a vehicle in accordance with the teachings disclosed herein is advantageous relative to conventional systems and methods In particular, the system and method adjust a predetermined deceleration value associated with the vehicle based on variations in the loads on, and mass of, the vehicle and control the timing of a cascade of braking commands (and other actions) and/or the force of the braking commands in response to the adjusted value to optimize braking of the vehicle despite the changes in the loads on, and mass of, the vehicle.

The foregoing and other aspects, features, details, utilities, and advantages of the present teachings will be apparent from reading the following description and claims, and from reviewing the accompanying drawings.

DETAILED DESCRIPTION OF THE INVENTION

Figure 1:
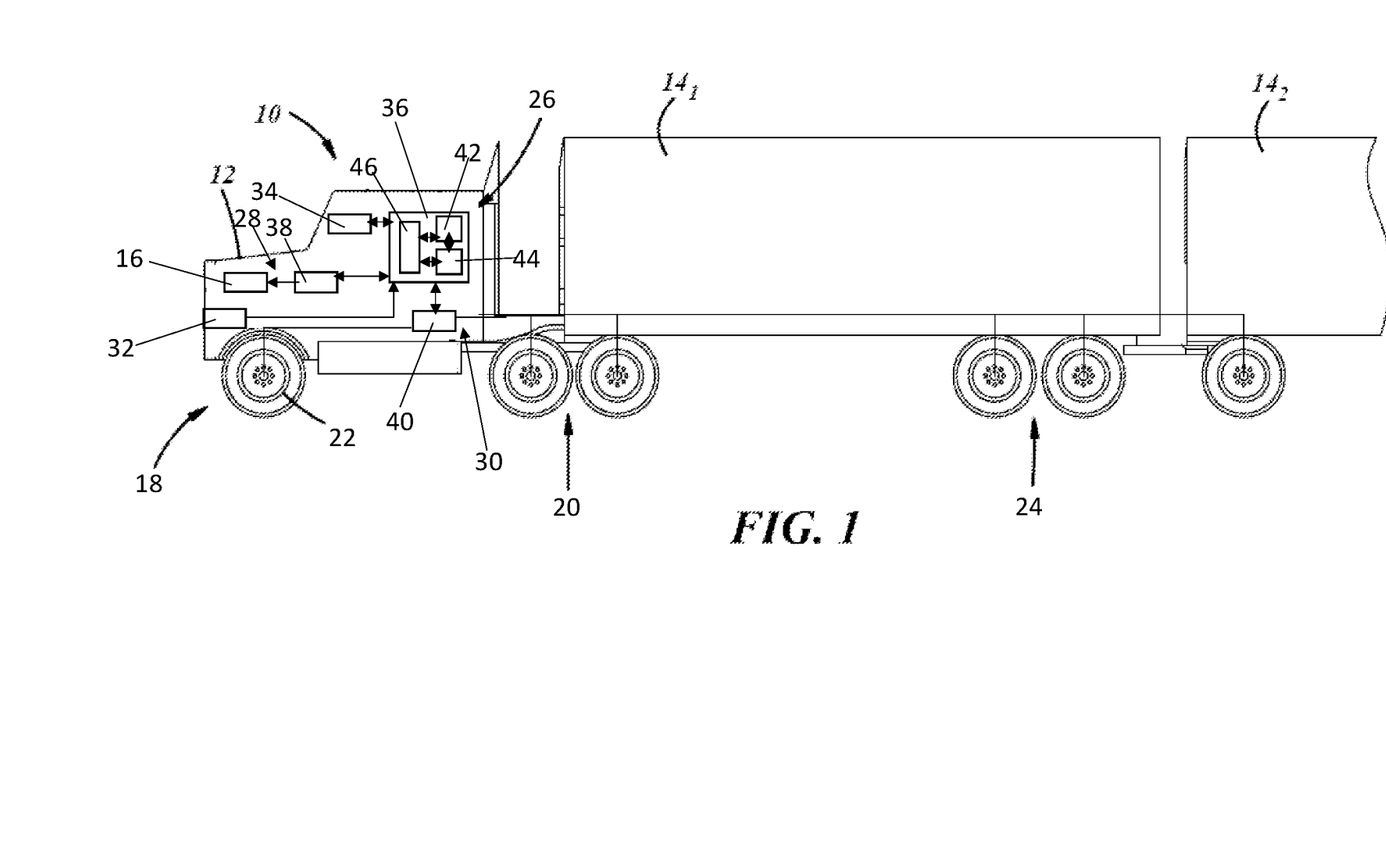
FIG. 1 is a diagrammatic view of a tractor-trailer incorporating one embodiment of a system for autonomous emergency braking in accordance with the teachings set forth herein.

Referring now to the drawings wherein like reference numerals are used to identify identical components in the various views, FIG. 1 illustrates a vehicle and, in particular, a tractor-trailer 10. Tractor-trailer 10 (also referred to as a semi) contains a truck or tractor 12 and one or more trailers $14_1 \ldots 14_N$. Tractor 12 contains a power unit, such as an internal combustion engine 16, and steering and drive axles 18, 20 each of which support one or more wheels 22 at either end. Trailers $14_1 \ldots 14_N$ are provided to store freight and are detachably coupled to tractor 12. Each trailer 14 is supported on one or more trailer axles 24, each of which may support one or more wheels 20 at either end. Although a pair of trailers 14 are shown in the illustrated embodiment, it should be understood that the number of trailers 14 attached to tractor 12 may vary. In accordance with the present teachings, tractor-trailer 10 may further include one or more advanced driver assistance systems 26 configured to implement autonomous emergency braking (AEB) of tractor-trailer 10 under certain conditions. System 26 may comprise, for example, a collision avoidance system and may include an engine brake system 28, a wheel brake system 30, one or more sensors 32, an operator interface 34 and an autonomous emergency braking (AEB) controller 36 that communicate with one another over a conventional vehicle communication bus such as a controller area network (CAN) (or another communications medium such as power line communication (PLC)). In certain embodiments, the elements of system 26 may communicate over the bus using the industry standard Society of Automotive Engineers (SAE) J1939 communication protocol.

Engine brake system 28 is provided to selectively reduce torque generated by engine 16 to brake tractor-trailer 10. System 28 may include an engine controller 38 that generates, responsive to braking commands from AEB controller 36, signals to control valves regulating the delivery of air and/or fuel to cylinders in engine 16 to halt the combustion process as well as valves used to exhaust compressed air from the cylinders to establish a mechanical drag on tractor-trailer 10 and brake tractor-trailer 10. Engine controller 38 may comprise a programmable microprocessor or microcontroller or may comprise an application specific integrated circuit (ASIC). Engine controller 38 may include a central processing unit (CPU) and a memory. Engine controller 38 may also include an input/output (I/O) interface through which engine controller 38 may receive a plurality of input signals and transmit a plurality of output signals. The input signals may include braking commands from AEB controller 36. The output signals may include signals used to control the aforementioned valves in engine 16.

Wheel brake system 30 is configured to brakes wheels 22 on tractor 12 and trailer 14 in order to slow or stop movement of tractor-trailer 10. System 30 may include a brake controller 40 that is configured to generate signals used to control valves in a fluid circuit that regulate the delivery of fluid pressure from a fluid source of the fluid circuit to brake actuators for disc brakes or drum brakes associated with each wheel 22 on tractor 12 and trailer 14. In accordance with the teachings disclosed herein, controller 40 may also generate such signals responsive to braking commands from AEB controller 36. Brake controller 40 may again comprise a programmable microprocessor or microcontroller or may comprise an application specific integrated circuit (ASIC). Brake controller 40 may include a central processing unit (CPU) and a memory. Brake controller 40 may also include an input/output (I/O) interface through which brake controller 40 may receive a plurality of input signals and transmit a plurality of output signals. The input signals may include braking commands from AEB controller 36. The output signals may include signals used to control the aforementioned valves in the fluid circuit. Brake controller 40 may be configured with appropriate programming instructions (i.e., software or a computer program) to implement anti-lock braking (ABS) and electronic stability control functions.

Sensors 32 are provided to identify objects within a defined field of view. Sensors 32 may comprise radar (radio detection and ranging) sensors, but may also comprise lidar (light detection and ranging) sensors, cameras or other sensors. In the illustrated embodiment, sensor 32 is located at the front of tractor 12 and identifies objects in front of tractor-trailer 10. It should be understood, however, that sensors 32 could be located at various locations on tractor-trailer 10 including on the sides of the vehicle (e.g., for blind spot monitoring, lane departure warning and lane change assist systems) or rear of the vehicle (e.g., for parking assistance systems). Each sensor 32 generates a signal indicative of an object within the field of view of the sensor 32 and transmits the signal to AEB controller 36.

Operator interface 34 provides means for alerting the vehicle operator regarding the initiation of autonomous emergency braking. Interface 34 may also provide means for alerting the vehicle operator regarding other aspects of autonomous emergency braking such as the location of objects in the path of travel of tractor-trailer 10 (e.g., by providing a warning when an object is too close to tractor-trailer 10). Interface 34 may include light emitters, such as light emitting diodes, sound emitters, such as a speaker, and/or haptic actuators to convey visual, audio and/or haptic alerts to the vehicle operator. In the case of visual alerts, a different information can be conveyed through differences in color, differences in intensity, differences in the number of lights, and differences in the pattern of activation of the lights. In the case of audio alerts, different information can be conveyed through differences in the type of sound generated, differences in volume and differences in the pattern of sounds. In the case of haptic alerts, different information can be conveyed through differences in the length, intensity or pattern of vibration.

Autonomous emergency braking (AEB) controller 36 determines whether objects detected by sensors 32 justify a warning to the vehicle operator or some other action including autonomous control of tractor-trailer 10 such as automated emergency braking. AEB controller 36 may comprise a programmable microprocessor or microcontroller or may comprise an application specific integrated circuit (ASIC). AEB controller 36 may include a central processing unit (CPU) 42 and a memory 44. AEB controller 36 may also include an input/output (I/O) interface 46 through which AEB controller 36 may receive a plurality of input signals and transmit a plurality of output signals. The input signals may include signals from sensors 32 indicative of the presence of objects within the field of view of sensors 32 and signals from operator interface 34. The output signals may include signals used to control engine brake system 28, wheel brake system 30 and operator interface 34. Although a single AEB controller 36 is shown in the illustrated embodiment, it should be understood that the functionality of AEB controller 36 could be divided among multiple sub-controllers including separate controllers on tractor 12 and trailer 14.

Figure 2:
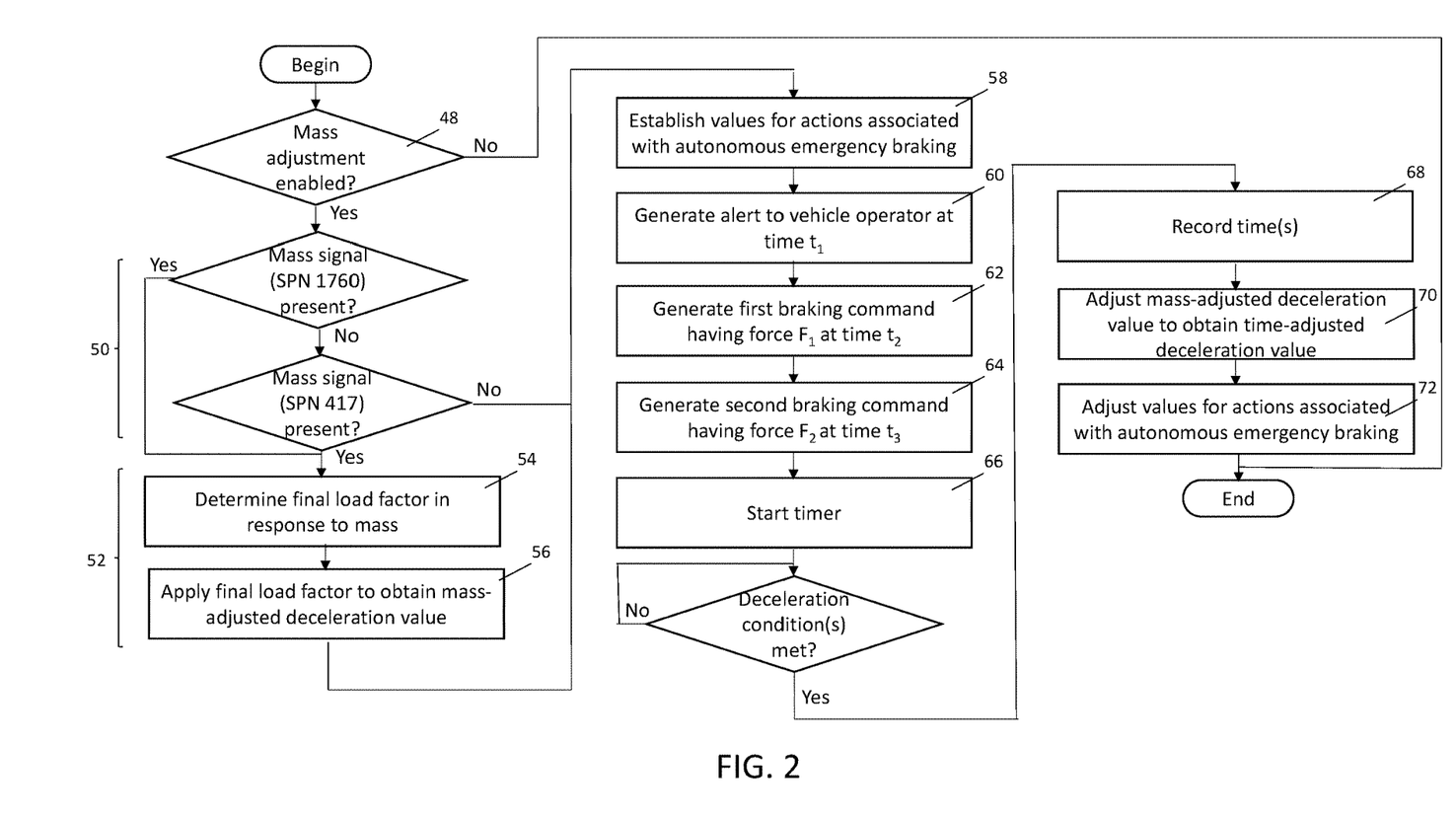
FIG. 2 is flow chart diagram illustrating several steps in one embodiment of a method for autonomous emergency braking in a vehicle in accordance with the teachings set forth herein.

Referring now to FIG. 2, in accordance with the present teachings, AEB controller 36 may be configured with appropriate programming instructions (i.e., software or a computer program) to implement several steps in a method for autonomous emergency braking in tractor-trailer 10. The method may begin with the step 48 of determining whether the disclosed control methodology considering the mass of the tractor-trailer 10 has been enabled. Use of the disclosed control methodology may be optional on any given tractor-trailer 10 and may be enabled by the vehicle operator (e.g., through an input through operator interface 34), by a fleet manager for the tractor-trailer 10 (e.g., by preprogramming AEB controller 36 prior to operation of tractor-trailer 10 (through operator interface 34 or in another way) or wireless transmission of a signal through a telematics system in tractor-trailer 10) or in response to various conditions associated with the operation of tractor-trailer 10 or the operating environment for tractor-trailer 10 that may be detected by various sensors on tractor-trailer 10. A flag stored in a memory such as memory 44 may be used to indicate whether or not use of the disclosed control methodology has been enabled or disabled and AEB controller 36 may access memory 44 to retrieve the flag and compare it against a predetermined value indicating that use of the control methodology has been enabled. If use of the control methodology has been disabled, the method may end. If use of the control methodology has been enabled, the method may proceed to subsequent steps.

In step 50, AEB controller 36 determines whether an indication of a mass of tractor-trailer 10 is present. AEB controller 36 may be configured to search for, and receive, various signals on the vehicle communication bus that are indicative of the mass of tractor-trailer 10. These signals may be generated, for example, by load sensors (not shown) on tractor-trailer 10 including on a kingpin of tractor-trailer 10 or axles 18, 20, 24, by engine controller 38 or a transmission controller responsive to input torque relative to the speed of tractor-trailer 10, and/or by brake controller 40 responsive to brake pressure (when ABS is not implemented). In accordance with one aspect of the disclosed system, AEB controller 36 may be configured to prioritize among the signals by first searching for signals that are the most likely to generate an accurate indication of the mass of tractor-trailer 10 (e.g., signals generated by axle mounted load sensors) and only subsequently searching for signals that are less likely to generate an accurate indication of the mass of tractor-trailer 10 if the signals most likely to generate an accurate indication of the mass of tractor-trailer 10 are not present on the communications bus. In one embodiment, AEB controller 36 may be configured to search for the presence of a signal on the communication bus corresponding to one of Suspect Parameter Number (SPN) 1760 and SPN 417 of the Society of Automotive Engineers J1939 communications protocol. SPN 1760 provides a value indicative of the total weight of tractor 12 and all attached trailers 14. SPN 417 provides a value indicative of the total weight of tractor 12 and all attached trailers 14 with onboard scales on tractor-trailer 10. If a signal corresponding to the preferred value among SPN 1760 and SPN 417 is not present, AEB controller 36 may be configured to search for the presence of a signal corresponding to the other of SPN 1760 and SPN 417. In the embodiment illustrated in FIG. 2, AEB controller 36 searches for the presence of a signal corresponding to SPN 1760 first and, if the signal is not found, searches for the presence of a signal corresponding to SPN 417. It should be understood, however, that the order may be reversed and that AEB controller 36 may search for other signals indicative of mass in addition to, or as an alternative to, one or both of the signals corresponding to SPN 1760 and SPN 417 and in different orders.

In the absence of an indication of the mass of tractor-trailer 10, AEB controller 36 is configured to implement autonomous emergency braking (whenever required) based on a predetermined or default deceleration value for tractor-trailer 10 that corresponds to a predetermined rate of deceleration for tractor-trailer 10. The predetermined deceleration value may be stored in a memory such as memory 44 of AEB controller 36. As discussed hereinabove, this deceleration value is typically set at a value that attempts to balance between the ability of the tractor-trailer 10 to decelerate when heavily loaded (in which case deceleration occurs more slowly) and when lightly loaded (in which case deceleration occurs more quickly) and therefore can fail to fully mitigate collision risk in heavily loaded vehicles while also sacrificing performance in lightly loaded vehicles which will come to a stop earlier than required. The predetermined deceleration value may, however, alternatively be set at a value indicative of a minimally loaded tractor 12 (i.e., a tractor without any trailers 14 attached) when deceleration is expected to occur relatively quickly or a value indicative of a maximally loaded tractor 12 (i.e., a tractor 12 with one or more trailers 14 and carrying the maximum possible load for tractor 12) when deceleration is expected occur relatively slowly.

When an indication of the mass of tractor-trailer 10 is present, the method may continue with the step 52 of adjusting the predetermined deceleration value in response to the mass of the vehicle to obtain a mass-adjusted deceleration value. Step 52 may include several substeps 54, 56. In substep 54, AEB controller 36 may determine a final load factor (FLF) responsive to the mass of tractor-trailer 10. In accordance with one embodiment, AEB controller 36 assigns the final load factor a first value if the mass of tractor-trailer 10 meets a predetermined condition relative to a first predetermined mass (e.g., 5000 Kg). For example, AEB controller 36 may assign the final load factor the first value if the mass of tractor-trailer 10 is less than the first predetermined mass. AEB controller 36 assigns the final load factor a second value if the mass of tractor-trailer 10 meets a predetermined condition relative to a second predetermined mass (e.g., 36000 Kg). For example, AEB controller 36 may assign the final load factor the second value if the mass of tractor-trailer 10 is greater than the second predetermined mass. If the predetermined conditions are not met (e.g., the mass is not less than the first predetermined mass and not greater than the second predetermined mass), AEB controller 36 may compute the final load factor in accordance with a predetermined formula. In accordance with one embodiment, AEB controller 36 uses the formula to adjust a default load factor (DLF) responsive to the mass of the vehicle to obtain the final load factor. In one embodiment, the default load factor is set to a value corresponding to a tractor 12 without any trailers 14. In such an embodiment, AEB controller 36 may compute the final load factor in accordance with the following formula:

$$FLF = \frac{M - \left(UB - \left(\frac{(LB - UB)}{DLF - BLF}\right) * BLF\right)}{\frac{LB - UB}{DLF - BLF}}$$

where FLF is the final load factor, DLF is the default load factor, M is the mass of tractor-trailer 10, UB and LB are upper (e.g., 36000 Kg) and lower (e.g., 5000 Kg) bounds, respectively, for the mass of tractor-trailer 10 contemplated by system 26, and BLF and CLF are the smallest and largest possible load factors, respectively, allowed by system 26. If the mass M of tractor-trailer 10 is less than LB or greater than UB, the final load factor FLF will be not greater than the default load factor DLF and no less than BLF. In another embodiment, the default load factor is set to a value corresponding to a tractor 12 towing a maximum load for the tractor 12. In such an embodiment, AEB controller 36 may compute the final load factor in accordance with the following formula:

$$FLF = \frac{M - \left(UB - \left(\frac{(LB - UB)}{CLF - DLF}\right) * DLF\right)}{\frac{LB - UB}{CLF - DLF}}$$

If the mass M of tractor-trailer 10 is less than LB or greater than UB, the final load factor FLF will be not greater than CLF and no less than DLF. In substep 56, AEB controller 36 applies the final load factor to the predetermined deceleration value to obtain the mass-adjusted deceleration value. In one embodiment, AEB controller 36 determines the mass-adjusted deceleration value in accordance with the following formula:

$$MADV = FLF * PDV$$

where MADV is the mass-adjusted deceleration value and PDF is the predetermined deceleration value.

In accordance with one aspect of the teachings disclosed herein, the mass-adjusted deceleration value that is obtained in step 52 may be independent of brake pressure. A variety of conventional systems exist that adjusting brake controls based on a various vehicle and environmental operating conditions. Many of these conventional systems base control, at least in part, on measured brake pressures. For commercial vehicles such as tractor-trailer 10 that employ pneumatic braking systems, however, measured brake pressure is unreliable indicator regarding brake capacity and effectiveness due to wear on various vehicle components including brake friction pads and tires. In accordance with another aspect of the teachings disclosed herein, the adjustment from the default deceleration to the mass-adjusted deceleration value may have a non-linear relationship with changes in the mass of tractor-trailer 10. In particular, the final load factor may be calculated in a manner such that variation in the final load factor (and, as a result the mass-adjusted deceleration value) does not occur linearly with variation in the mass of tractor-trailer 10 to better approximate the potentially non-linear relationship between vehicle stopping distances/times and vehicle mass.

Referring again to FIG. 2, the method may continue with the step 58 of establishing, responsive to the mass-adjusted deceleration value (or responsive to the predetermined deceleration value if an indication of the mass of tractor-trailer is not present in step 50), a cascade of values associated with multiple actions associated with autonomous emergency braking of tractor-trailer 10. In accordance with one aspect of certain embodiments the system and method disclosed herein, variation in the mass of tractor-trailer 10 impacts a coordinated series of actions associated with autonomous emergency braking and impacts each action in a similar manner. In one embodiment, AEB controller 36 establishes a first time $t_1$ for generating an alert to an operator of tractor-trailer 10 regarding initiation of autonomous emergency braking, a second time $t_2$ that is later than the first time for generating a first braking command to one or both of engine controller 38 and brake controller 40, and a third time $t_3$ that is later than the second time for generating a second braking command to one or both of engine controller 38 or brake controller 40. In another embodiment, AEB controller 36 establishes a first braking force $F_1$ for the first braking command and a second braking force $F_2$, greater than the first braking force $F_1$, or the second braking command. The first braking command is configured to cause deceleration of tractor-trailer 10 at a first rate of deceleration while the second braking command is configured to cause deceleration of tractor-trailer 10 at a second rate of deceleration greater than the first rate of deceleration. The cascade of values for this coordinated series of actions may be impacted by the mass-adjusted deceleration value in a similar manner. For example, to bring tractor-trailer 10 to a stop at time $t_s$, times $t_1$, $t_2$ and $t_3$ may default to about 3.5 seconds, 3.2 seconds and 2.75 seconds respectively before time $t_s$ based on the predetermined deceleration value. If tractor-trailer 10 is heavily loaded, the mass-adjusted deceleration value will reflect that braking performance will decrease as a result of the larger mass of tractor-trailer 10. In an instance where the mass-adjusted deceleration value reflects an expectation that braking performance will decrease to 70% of the expected performance due to the increased mass of tractor-trailer 10, AEB controller 36 may establish times $t_1$, $t_2$ and $t_3$ of about 5 seconds, 4.6 seconds and 3.9 seconds, respectively, before time $t_s$ in response to the mass-adjusted deceleration value. The method may continue with the steps 60, 62, 64 of generating, responsive to any collision risk signal from sensor 32, the alert to the vehicle operator at time $t_1$, the first braking command at time $t_2$ and the second braking command at time $t_3$.

In some embodiments the method may include additional steps to account for brake activation delays that may occur in commercial vehicle systems employing pneumatic braking systems. Although these delays may be accounted for to some degree by adjusting certain pre-programmed values in AEB controller 36, this methodology fails to account for variation in activation delays among individual vehicles. In accordance with one embodiment, therefore, the method may continue with the steps 66, 68 of initiating a timer upon generation of either the first braking command or the second braking command and recording the time indicated by the timer when a predetermined condition indictive of an amount of deceleration in tractor-trailer is met to establish a deceleration time (alternatively, as opposed to using the braking commands generated by AEB controller 36, braking command signals from other systems (e.g., adaptive cruise control or stability control systems) could be used to initiate the timer). For example, AEB controller 36 may be configured to record the time when brake controller 40 generates a signal indicating that a predetermined level of deceleration (e.g., 1 m/s$^2$) has been exceeded or when brake controller 40 generates a signal indicating that the brakes have been activated (e.g., when brake pressure has reached a predetermined pressure threshold at which the stop lamp on the vehicle is illuminated). In other embodiments, the time indicated by the timer may be recorded at multiple times (e.g., both when the brake controller 40 generates a signal indicating that a predetermined level of deceleration has been exceeded and when the brake controller 40 generates a signal indicating that the brakes have been activated) and the times averaged to obtain the deceleration time. In yet other embodiments, the time for the same event occurring during successive braking actions in tractor-trailer 10 may be recorded a plurality of times and AEB controller 36 may make a prediction, based on a trend of the recorded times, of the time for the same event to occur during the next braking action in tractor-trailer 10 and establish the deceleration time responsive to the predicted time. The method may then continue with the steps 70, 72 of adjusting the mass-adjusted deceleration value responsive to the deceleration time to obtain a time-adjusted deceleration value and adjusting, responsive to the time-adjusted deceleration value, the times $t_1$, $t_2$ and $t_3$ for generating the alert to the vehicle operator and the first and second braking commands and/or the forces $F_1$, $F_2$ for the first and second braking commands.

A system and method for autonomous emergency braking in a vehicle in accordance with the teachings disclosed herein is advantageous relative to conventional systems and methods In particular, the system and method adjust a predetermined deceleration value associated with the vehicle based on variations in the loads on, and mass of, the vehicle and control the timing of a cascade of braking commands (and other actions) and/or the force of the braking commands in response to the adjusted value to optimize braking of the vehicle despite the changes in the loads on, and mass of, the vehicle.

While the invention has been shown and described with reference to one or more particular embodiments thereof, it will be understood by those of skill in the art that various changes and modifications can be made without departing from the spirit and scope of the invention. For example, the over molding and clamping technology disclosed herein is not limited to wheel speed sensors, but may also be used for other sensors having similar mounting arrangements including transmission sensors and crankshaft sensors.

What is claimed is:

1. An autonomous emergency braking system for a vehicle, comprising:
   a sensor configured to generate a collision risk signal indicative of an object in a path of travel of the vehicle; and,
   an autonomous emergency braking controller configured to
   determine whether an indication of a mass of the vehicle is present;
   adjust, if an indication of the mass of the vehicle is present, a first deceleration value corresponding to a predetermined rate of deceleration for the vehicle in response to the mass of the vehicle to obtain second deceleration value;
   establish, responsive to the second deceleration value, one of a first time for generation of a first braking command to one of an engine controller and a brake controller and a first braking force for the first braking command, the first braking command configured to cause deceleration of the vehicle at a first rate of deceleration, and a corresponding one of a second time, later than the first time, for generation of a second braking command to the one of the engine controller and the brake controller and a second braking force, greater than the first braking force, for the second braking command, the second braking command configured to cause deceleration of the vehicle at a second rate of deceleration greater than the first rate of deceleration; and,
   generate, responsive to the collision risk signal, the first braking command and the second braking command
   wherein the autonomous emergency braking controller is further configured, in adjusting the first deceleration value, to
   determine a final load factor responsive to the mass of the vehicle; and,
   apply the final load factor to the first deceleration value to obtain the second deceleration value; and
   wherein the final load factor is assigned a first value if the mass of the vehicle is less than a first predetermined mass, the final load factor is assigned a second value if the mass of the vehicle is greater than a second predetermined mass and the final load factor is computed in accordance with a predetermined formula if the mass of the vehicle is not less than the first predetermined mass and not greater than the second predetermined mass.

2. The autonomous emergency braking system of claim 1, wherein the autonomous emergency braking controller is further configured, in determining whether an indication of a mass of the vehicle is present to:
   determine whether a first signal indicative of the mass of the vehicle is present on a vehicle communication bus; and,
   determine, if the first signal is not present on the vehicle communication bus, whether a second signal indicative of the mass of the vehicle is present on the vehicle communication bus.

3. The autonomous emergency braking system of claim 1 wherein the vehicle comprises a tractor and the autonomous emergency braking controller is further configured, in determining the final load factor, to adjust a default load factor responsive to the mass of the vehicle to obtain the final load factor, the default load factor set to a value corresponding to one of the tractor without any trailer and the tractor towing a maximum load for the tractor.

4. The autonomous emergency braking system of claim 1 wherein the autonomous emergency braking controller is configured to adjust the first deceleration value to obtain the second deceleration value independent of a brake pressure.

5. The autonomous emergency braking system of claim 1 wherein a difference between the second rate of deceleration and the first rate of deceleration has a non-linear relationship with a change in the amount of the mass of the vehicle.

6. The autonomous emergency braking system of claim 1, wherein the autonomous emergency braking controller is further configured to:
   initiate a timer upon generation of one of the first braking command and the second braking command;
   record a time on the timer when a predetermined condition indictive of an amount of deceleration in the vehicle is met to establish a deceleration time;
   adjust the second deceleration value responsive to the deceleration time to obtain a third deceleration value; and,
   adjust, responsive to the third deceleration value, the one of the first time and the first braking force and the corresponding one of the second time and the second braking force.

7. The autonomous emergency braking system of claim 1, wherein the autonomous emergency braking controller is further configured to establish, responsive to the second deceleration value, a third time, prior to the first time, for generation of an alert to an operator of the vehicle regarding initiation of braking.

8. A method for autonomous emergency braking in a vehicle, comprising:
   determining whether an indication of a mass of the vehicle is present;
   adjusting, if an indication of the mass of the vehicle is present, a first deceleration value corresponding to a predetermined rate of deceleration for the vehicle in response to the mass of the vehicle to obtain second deceleration value;
   establishing, responsive to the second deceleration value, one of a first time for generation of a first braking command to one of an engine controller and a brake controller and a first braking force for the first braking command, the first braking command configured to cause deceleration of the vehicle at a first rate of deceleration, and a corresponding one of a second time, later than the first time, for generation of a second braking command to the one of the engine controller and the brake controller and a second braking force, greater than the first brake force, for the second braking command, the second braking command configured to cause deceleration of the vehicle at a second rate of deceleration greater than the first rate of deceleration; and,
   generating, responsive to a collision risk signal indicative of an object in a path of travel of the vehicle, the first braking command and the second braking command
   wherein adjusting the first deceleration value includes
      determining a final load factor responsive to the mass of the vehicle; and,
      applying the final load factor to the first deceleration value to obtain the second deceleration value; and
   wherein the final load factor is assigned a first value if the mass of the vehicle is less than a first predetermined mass, the final load factor is assigned a second value if the mass of the vehicle is greater than a second predetermined mass and the final load factor is computed in accordance with a predetermined formula if the mass of the vehicle is not less than the first predetermined mass and not greater than the second predetermined mass.

9. The method of claim 8 wherein determining whether an indication of a mass of the vehicle is present includes:
   determining whether a first signal indicative of the mass of the vehicle is present on a vehicle communication bus; and,
   determining, if the first signal is not present on the vehicle communication bus, whether a second signal indicative of the mass of the vehicle is present on the vehicle communication bus.

10. The method of claim 8 wherein the vehicle comprises a tractor and determining the final load factor includes adjusting a default load factor responsive to the mass of the vehicle to obtain the final load factor, the default load factor set to a value corresponding to one of the tractor without any trailer and the tractor towing a maximum load for the tractor.

11. The method of claim 8 wherein adjusting the first deceleration value to obtain the second deceleration value occurs independent of a brake pressure.

12. The method of claim 8 wherein a difference between the second rate of deceleration and the first rate of deceleration has a non-linear relationship with a change in the amount of the mass of the vehicle.

13. The method of claim 8, further comprising:
   initiating a timer upon generation one of the first braking command and the second braking command;
   recording a time on the timer when a predetermined condition indictive of an amount of deceleration in the vehicle is met to establish a deceleration time;
   adjusting the second deceleration value responsive to the deceleration time to obtain a third deceleration value; and,
   adjusting, responsive to the third deceleration value, the one of the first time and the first braking force and the corresponding one of the second time and the second braking force.

14. The method of claim 8, further comprising establishing, responsive to the second deceleration value, a third time, prior to the first time, for generation of an alert to an operator of the vehicle regarding initiation of braking.

15. An article of manufacture, comprising:

a non-transitory computer storage medium having a computer program encoded thereon that when executed by a controller implements autonomous emergency braking in a vehicle, the computer program including code for:

determining whether an indication of a mass of the vehicle is present;

adjusting, if an indication of the mass of the vehicle is present, a first deceleration value corresponding to a predetermined rate of deceleration for the vehicle in response to the mass of the vehicle to obtain second deceleration value; and, establishing, responsive to the second deceleration value, one of a first time for generation of a first braking command to one of an engine controller and a brake controller and a first braking force for the first braking command, the first braking command configured to cause deceleration of the vehicle at a first rate of deceleration, and a corresponding one of a second time, later than the first time, for generation of a second braking command to the one of the engine controller and the brake controller and a second braking force, greater than the first brake force, for the second braking command, the second braking command configured to cause deceleration of the vehicle at a second rate of deceleration greater than the first rate of deceleration;

generating, responsive to a collision risk signal indicative of an object in a path of travel of the vehicle, the first braking command and the second braking command;

initiating a timer upon generation of one of the first braking command and the second braking command;

recording a time on the timer when a predetermined condition indictive of an amount of deceleration in the vehicle is met to establish a deceleration time;

adjusting the second deceleration value responsive to the deceleration time to obtain a third deceleration value; and, adjusting, responsive to the third deceleration value, the one of the first time and the first braking force and the corresponding one of the second time and the second braking force.

* * * * *